Oct. 5, 1965  W. A. VAN WICKLIN, JR  3,209,610
STEERING GEAR
Filed Oct. 28, 1963  2 Sheets-Sheet 1
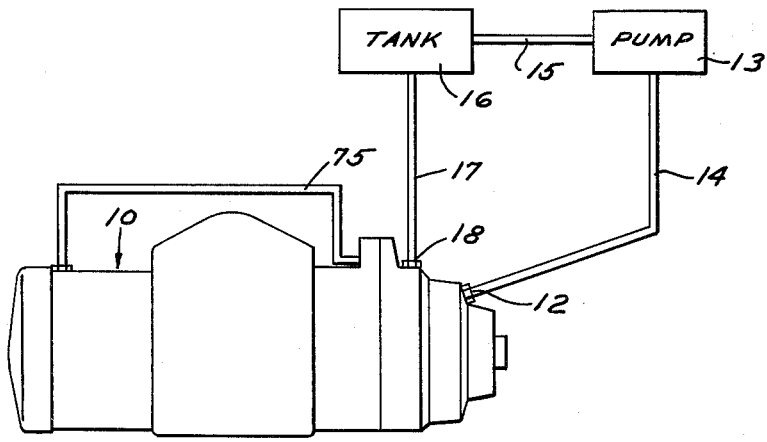
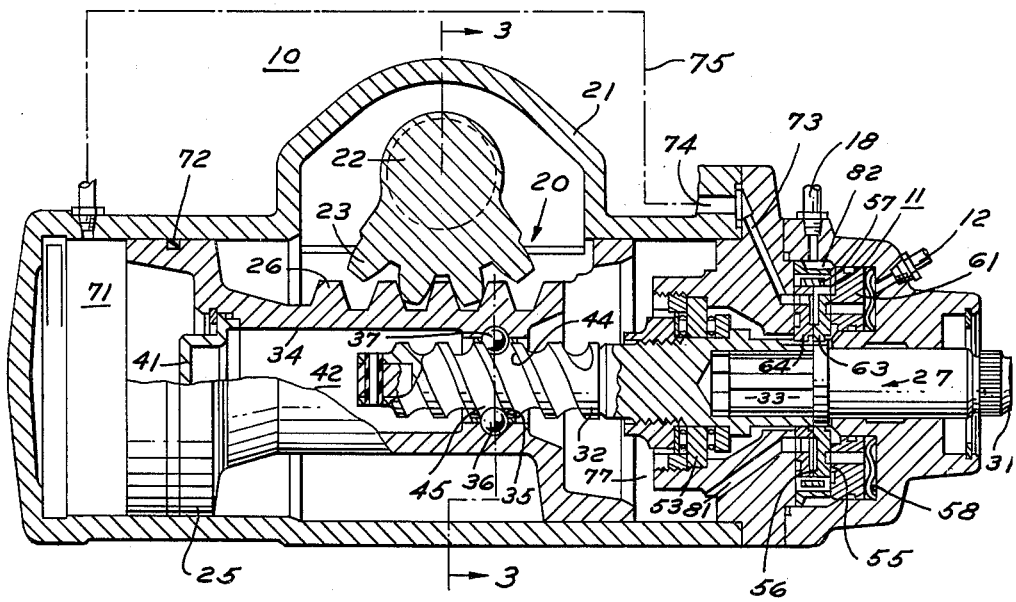
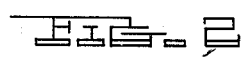
WARREN A. VAN WICKLIN, Jr.,
INVENTOR.
BY John R. Faulkner
Keith L. Zerschling
ATTORNEYS Oct. 5, 1965  W. A. VAN WICKLIN, JR  3,209,610
STEERING GEAR
Filed Oct. 28, 1963  2 Sheets-Sheet 2
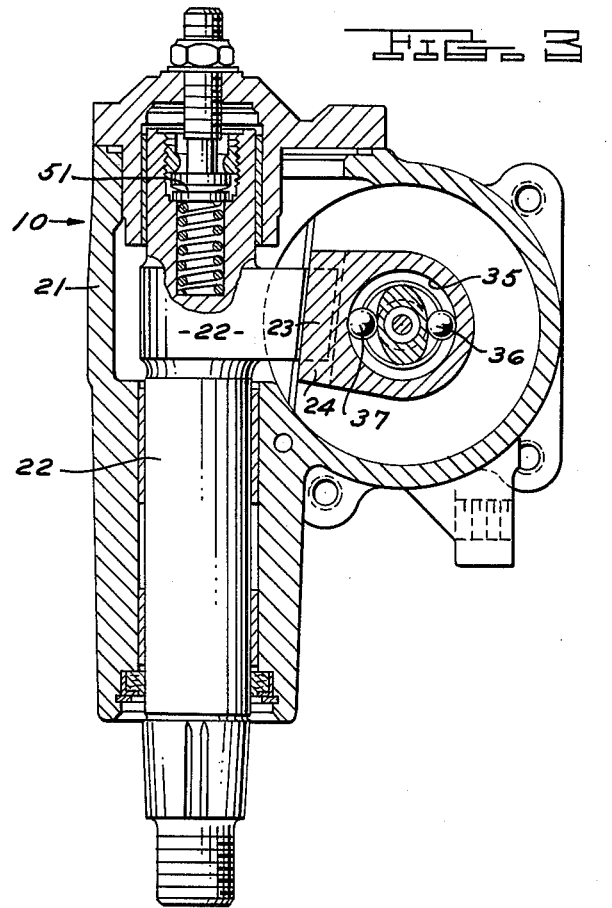
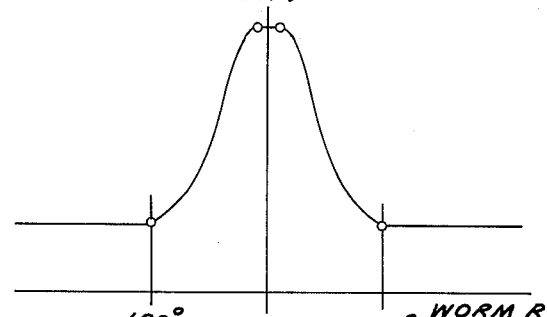
WARREN A. VAN WICKLIN, Jr.
INVENTOR.
BY
John R. Faulkner
Keith L. Zerschling
ATTORNEYS 3,209,610
STEERING GEAR
Warren A. Van Wicklin, Jr., Dearborn, Mich., assignor to Ford Motor Company, Dearborn, Mich., a corporation of Delaware
Filed Oct. 28, 1963, Ser. No. 319,189
7 Claims. (Cl. 74—424.8)

This invention relates to a variable ratio steering gear and more particularly to a variable ratio steering gear that may employ fluid power assist.

The variable ratio steering gear of this invention employs a new and novel variable ratio ball nut and worm mechanism. In this mechanism the output member forms the ball nut portion and it preferably has an internal annular groove positioned to surround the worm driven by the input member of the steering gear. The worm is of the double thread type and has two grooves displaced relative to each other. The output member carrier a pair of balls preferably in the annular groove with one ball being located in each of the grooves in the worm. The two grooves in the worm can thus be made with variable lead angles with the smallest or minimum lead angle being positioned at the center of the worm and increasing toward each end of the worm. This provides variable ratio steering in which slow steering or a high steering ratio is provided in the on-center position of the gear with lower ratios or faster steering being provided on either side of center.

The ball nut mechanism of the invention may be adapted easily to an in-line type integral power steering gear in which the nut is integral with the piston. The annular groove described above may be formed in the internal portion of the piston thus providing a variable ratio power assisted steering gear.

It is preferred to construct the worm so that the two grooves are positioned diametrically opposite one another, or 180° out of phase. Thus, the two balls will be located 180° from each other in the annular groove. The operating forces on the worm and ball nut (the power piston when the invention is used in a power steering gear) are thus balanced and the need for a radial bearing that would otherwise be required to support the end of the worm adjacent the balls is unnecessary.

In the integral type hydraulic power steering gear designs, it is frequently desirable to have the inner surface of the hydraulic piston operate at different pressures than one of the external surfaces. The construction described above is particularly well suited to such an application since there is no need for holes to be drilled into the walls of the piston to provide either transfer tubes or other mechanisms that need to be sealed with high pressure hydraulic seals.

An object of the invention is the provision of an uncomplicated variable ratio steering gear in which the forces on the input and output members are substantially balanced.

Another object of the invention is the provision of a variable ratio power steering gear of the in-line integral type in which the need for drilling through the side walls of the piston have been eliminated thereby eliminating costly and complex sealing problems.

A further object of the invention is the provision of a variable ratio steering gear that is reliable, inexpensive and easy to assemble.

Other objects and attendant advantages of the present invention will become more fully apparent as the specification is considered in connection with the attached drawings in which:

FIGURE 1 is a schematic of the power steering gear of the present invention;

FIGURE 2 is a longitudinal sectional view of the power steering gear shown in FIGURE 1;

FIGURE 3 is a sectional view taken along the lines 3—3 of FIGURE 2; and

FIGURE 4 is a graph showing how the gear ratio varies as the gear is rotated either side of center.

Referring now to the drawing in which like reference numerals designate like parts throughout the several views thereof, there is shown in FIGURE 1 a schematic diagram of the power steering gear embodiment of the present invention. The reference numeral 10 designates the power steering gear that has a valve 11 for controlling the application of fluid under pressure to assist the steering of the vehicle. The valve 11 has an inlet port 12 connected to a conventional power steering pump 13 through conduit 14. The pump is connected through a conduit 15 to a tank or sump 16, and the tank or sump 16 is connected through a conduit 17 with the outlet port 18 of the valve 11.

Referring now to FIGURES 2 and 3, the steering gear 10 includes a housing 21 that has mounted therein an output group or member 20. This output group or member 20 includes an output shaft 22 having a sector gear portion 23 and a power piston 25 having a rack 26 that engages the sector gear portion 23. Thus, reciprocatory motion of the power piston 25 is converted to rotary motion of the output shaft 22 by means of the sector gear 23 and rack 26.

The input group or member 27 of the steering gear 10 includes an input shaft 31 and a worm 32. In a manual type steering gear these two members may be formed integrally or fastened together by any suitable means. In the power steering gear shown they are coupled through a lost motion connection 33 in the form of a loose spline connection that may have a few degrees of lash. The input shaft 31 and the worm 32 are also coupled through the valve 11 as will be described in more detail subsequently.

The rotary motion of the worm 32 must be converted into reciprocatory or translatory motion of the power piston 25, and in this invention this is done by means of a new and novel ball nut and worm mechanism. As illustrated, the power piston 25 includes an internal surface 34 that has an annular groove 35 positioned therein, and this annular groove carriers a first ball 36 and a second ball 37. The integral surface 34 together with a plug member 41 forms a chamber 42 for reception coaxially of the worm 32.

The worm 32 is of the double thread type in which two grooves 44 and 45 are cut. These grooves are preferably displaced in phase by 180° so that they are diametrically opposite each other on the worm. They also have identical lead angles at every section normal to the worm axis. The balls 36 and 37 are positioned in the grooves 45 and 44 respectively and thus connect the worm 32 to the power piston 25. A ball separator or cage 38 may be used to locate the balls equidistant from one another.

By reason of the fact that only a single ball is employed in each groove in the worm 32, the two grooves may have variable lead angles, with the lead angles being the smallest at the center position of the worm so that the gear ratio is highest at the on-center position of the gear. The lead angles gradually increase out to a given position on the worm so that the gear ratio increases progressively to this point. From these points outwardly toward the end of the worm the lead angles may again be constant, but substantially greater than at any other position on the worm.

The graph of FIGURE 4 shows the gear ratio of the steering gear 10 plotted against worm rotation in degrees. The gear ratio is a maximum in the on-center position, decreases progressively to 180° rotation of the worm either side of center and then remains constant from 180° to the locked position of the wheels.

In the operation of the gear, the two balls 36 and 37 travel about the groove 35 as the worm 32 is rotated in a manner similar to that of a planet gear in a planetary gear train. The rotary motion of the worm is thus converted to reciprocatory motion of the power piston 25. Since only one ball is positioned in each of the variable lead grooves 44 and 45 of the worm 32 the balls 36 and 37 will not jam in the groove. The reason for this is that the use of one ball in each groove results in a zero length ball circuit since in rigid body mechanics the contact length of a ball is zero.

It is apparent that more than two grooves may be employed if it is desired to further balance the loading on the worm 32 and piston 25 or to provide increased load capacity. In this case, a triple thread or quadruple thread worm may be employed, and it is preferable in this case that the grooves be displaced equally about the shaft. With a three thread or groove worm, the grooves would be displaced 120° from one another and with a four thread or groove worm the grooves would be displaced 90° from one another. In each of these cases the number of balls would be equal to the number of grooves in the worm.

The remainder of the gear may be of conventional construction. As shown in FIGURE 3, a standard lash adjusting mechanism 51 may be used to shift the output shaft axially in the housing 21 and relative to the inclined teeth af the rack 26 to provide an initial lash adjustment of the sector gear 23 and the rack 26.

The worm 32 is positioned in the housing 21 by means of a conventional thrust and radial bearing arrangement 53 as more fully described in co-pending application S.N. 248,930, filed January 2, 1963 in the name of John R. Elwell and assigned to the assignee of this invention. This structure limits the axial movement of the worm 32 relative to the housing 21 and also furnishes a radial bearing of substantial strength for the worm 32.

The valve 11 for controlling the flow of fluid under pressure from the pump 13 to the power piston 25 is also shown and described in the above-mentioned patent application. Basically, this valve comprises a first rotary valve plate 55 and a second rotary valve plate 56 that are biased to a neutral position by means of a C-spring 57. Fluid flowing from the pump 13 to the inlet port 12 through the conduit 14 is fed to an annular chamber 58 and then to the first rotary plate 55 through a sealing piston member 61.

Relative rotation of the two rotary valve plates 55 and 56 against the bias of the C-spring 57 occurs when sufficient torque is applied to the input shaft 31 to call for power assist. This torque causes relative rotation between the input shaft 31 to which the rotary valve plate 55 is attached by means of keying, as shown at 62, and the worm 32 to which the rotary valve plate 56 is attached by means of keying shown at 64.

When the torque on the input shaft 31 is in one direction, for example, in a direction to execute a righthand turn, relative rotation occurs between the rotary valve plates 55 and 56 so that fluid under pressure is fed to the chamber 71 positioned on one side of the piston ring 72. This is done through conduits 73, 74 and 75. At the same time, fluid is exhausted from chamber 77 that forms the remainder of the interior of the housing 21 through conduit 81, through the rotary valve plates 55 and 56, through an external annular cavity 82 and then to the tank or sump 16 through the outlet port 18 and the conduit 17.

When torque above the predetermined amount, torque sufficient to call for power assist, is applied to the input shaft 31 in the other direction, fluid under pressure is supplied to the chamber 77 through the rotary valve plates 55 and 56 and the conduit 81. Fluid is exhausted from the chamber 71 through the conduits 75, 74 and 73, through the valve 11 including the rotary valve plates 55 and 56. From there the fluid flows to the annular cavity 82 and is exhausted to the tank or sump 16 through the outlet port 18.

The present invention may thus be used with either a manual steering gear or a power steering gear. In the manual gear there is a direct connection from the input shaft 31 to the worm 32, and the rotary motion applied to the input shaft results through the ball nut arrangement of the invention, in reciprocatory motion of an output member that preferably includes the rack 26 as illustrated. This reciprocatory motion is then converted to rotary motion at the output shaft 22 through the rack 26 and the sector gear 23 on the output shaft 22. With the power steering gear described above, this action is power assisted by the use of fluid under pressure directed to either side of the power piston 25 (either chamber 71 or 77) by the valve 11.

The present invention thus provides a new and novel ball nut and worm that can be employed to provide a variable ratio steering gear. It is inexpensive, employs a minimum number of parts, and is at the same time efficient and provides few, if any, sealing problems. It can be appreciated that since the annular groove 35 does not extend through the wall of the piston 25, no sealing problems are involved in this area of the gear.

It can be appreciated also that it is very easy to assemble the worm and ball nut arrangement of this invention. There are no transfer tubes, clamps, screws, etc., that are normally employed with a ball nut and worm mechanism. All that needs to be done is to locate the two balls 36 and 37 in the annular groove 35, with the aid of the ball locator, 38 and to thread the worm 32 into the piston by locating one of the balls in each of the grooves 44 and 45 in the worm.

It will be understood that the invention is not to be limited to the exact construction shown and described, but that various changes and modifications may be made without departing from the spirit and scope of the invention as defined in the appended claims.

I claim:

1. A variable ratio steering gear comprising, an input member, an output member, said input member including a double thread worm, each thread having a variable lead, a first ball carried by said output member and engaging one of said variable lead threads in said worm, a second ball carried by said output member and engaging the other of said variable lead threads in said worm.

2. A variable ratio steering gear comprising, an input member, an output member, said input member including a double thread worm, said double thread worm including a first variable lead thread and a second variable lead thread, each of said variable lead threads having minimum lead in the center position of the gear and increasing progressively either side of the center postion, said first variable lead thread being spaced 180° out of phase with respect to said second variable lead thread, said output member surrounding said worm and having an annular groove positioned therein adjacent said double thread worm, a first ball engaging said first variable lead thread in said worm and being positioned in said annular groove, and a second ball engaging said second variable lead thread and being positioned in said annualr groove.

3. A variable ratio steering gear comprising, an input member, an output member, said input member including a plural thread worm, said plural thread worm including a plurality of variable lead threads, each of said variable lead threads having minimum lead in the center position of the gear and increasing progressively either side of the center position, said variable lead threads being equally spaced on said worm, said output member surrounding said worm and having an annular groove positioned therein adjacent said worm, and a single ball engaging each of said variable led threads and being positioned in said annular groove.

4. A variable ratio steering gear comprising an input member, an output member, said input member including a double groove worm, said double groove worm including a first variable lead groove and a second variable lead groove, said first variable lead groove and said second variable lead groove being positioned diametrically opposite on said worm and having identical lead angles at every section normal to the worm axis, the lead angle of each of said grooves being a minimum in the center position of said gear and increasing toward each end, said output member including a portion surrounding said worm and having an annular groove positioned therein at right angles to the axis of said worm, a first ball positioned in said first variable lead groove in said worm and in said annular groove and a second ball positioned in said second variable lead groove in said worm and in said annular groove, said first ball maintaining a position in said annular groove displaced 180° from said second ball.

5. A variable ratio steering gear comprising an input member, an output member, said input member including a plural groove worm having a plurality of variable lead grooves, said variable lead grooves being equally spaced on said worm and having identical lead angles at every section normal to the worm axis, the lead angle of each of said grooves being a minimum in the center and increasing toward each end, said output member including a portion surrounding said worm and having an annular groove positioned therein at right angles to said worm, a single ball positioned in each of said variable lead grooves in said worm and in said annular groove, each of said balls being free to revolve in said annular groove relative to said output member and said worm.

6. A variable ratio power steering gear comprising, a housing, a fluid operated power piston mounted for reciprocatory movement in said housing, an output shaft, means coupling said power piston with said output shaft for converting reciprocatory motion of said power piston to rotary motion of said output shaft, an input shaft mounted in said housing coaxial with said piston, a worm mounted coaxially within said piston and coupled to said input shaft by means of a lost motion connection, valve means operable by a predetermined torque applied to said input shaft for directiing fluid under pressure to said fluid operated power piston, said worm including a first variable lead groove and a second variable lead groove, said first variable lead groove and said second variable lead groove being positioned diametrically opposite on said worm and having identical lead angles at every section normal to the worm axis, the lead angle of each of said groves being a minimum in the center and increasing toward each end, said piston having an internal surface, said internal surface having an annular groove positioned therein at right angles to said worm, a first ball positioned in said first variable lead groove in said worm and in said annular groove and a second ball poistioned in said second variable lead groove in said worm and in said annular groove, said first ball maintaining a position in said annular groove displaced 180° from said second ball.

7. A variable ratio power steering gear comprising, a housing, a fluid operated power piston mounted for reciprocatory movement in said housing, an output shaft, means coupling said power piston with said output shaft for converting reciprocatory motion of said power piston to rotary motion of said output shaft, an input shaft mounted in said housing coaxial with said piston, a worm mounted coaxially within said piston and coupled to said input shaft by means of a lost motion connnection, valve means coupling said input shaft and said worm and operable by a predetermined torque applied to said input shaft for directing fluid under pressure to said fluid operated power piston, said worm including a plurality of variable lead grooves, said plurality of variable lead grooves being equally spaced on said worm and having identical lead angles at every section normal to the worm axis, the lead angle of each of said grooves being a minimum in the center and increasing toward each end, said piston having an internal surface, said internal surface having an annular groove positioned therein at right angles to the axis of said worm, a single ball positioned in each of said variable lead grooves in said worm and in said annular groove in the internal surface of said piston, said balls being free to revolve in said annular groove relative to said piston and said worm as said worm is rotated.

References Cited by the Examiner

UNITED STATES PATENTS

| 3,014,379 | 12/61 | Wise | 74—424.8 |
| 3,116,931 | 1/64 | Edwards | 74—424.8 X |

DON A. WAITE, *Primary Examiner.*